United States Patent [19]

Szedlmajer

[11] Patent Number: 4,691,165

[45] Date of Patent: Sep. 1, 1987

[54] METHOD AND APPARATUS INCLUDING SPACED ANTENNAS FOR DETERMINING THE TRACE AND DEPTH OF UNDERGROUND METALLIC CONDUCTORS

[76] Inventor: Laszlo Szedlmajer, Zolyomi UT. 29, H-1112 Budapest, Hungary

[21] Appl. No.: 596,464

[22] PCT Filed: Jul. 7, 1983

[86] PCT No.: PCT/HU83/00037
§ 371 Date: Mar. 9, 1984
§ 102(e) Date: Mar. 9, 1984

[87] PCT Pub. No.: WO84/00423
PCT Pub. Date: Feb. 2, 1984

[51] Int. Cl.[4] .......................... G01V 3/11; G01B 7/14
[52] U.S. Cl. ................................................... 324/326
[58] Field of Search ................ 324/67, 207, 326, 329

[56] References Cited

U.S. PATENT DOCUMENTS

| 3,418,572 | 12/1968 | Humphreys | 324/67 |
| 3,617,865 | 11/1971 | Hakata | 324/67 X |
| 3,893,025 | 7/1975 | Humphreys | 324/67 X |
| 3,988,663 | 10/1976 | Slough et al. | 324/326 |
| 4,220,913 | 9/1980 | Howell et al. | 324/326 X |
| 4,387,340 | 6/1983 | Peterman | 324/326 |

FOREIGN PATENT DOCUMENTS

| 0219493 | 4/1957 | Australia | 324/67 |
| 865493 | 2/1953 | Fed. Rep. of Germany . | |
| 955348 | 1/1957 | Fed. Rep. of Germany . | |
| 1054160 | 4/1959 | Fed. Rep. of Germany . | |
| 1064164 | 8/1959 | Fed. Rep. of Germany . | |
| 1064655 | 9/1959 | Fed. Rep. of Germany . | |
| 1232669 | 1/1967 | Fed. Rep. of Germany . | |
| 2037865 | 2/1972 | Fed. Rep. of Germany . | |
| 0075352 | 6/1977 | Japan | 324/326 |
| 0066170 | 5/1979 | Japan | 324/326 |
| 0143253 | 11/1979 | Japan | 324/67 |
| 0140276 | 11/1981 | Japan | 324/67 |
| 0056769 | 4/1982 | Japan | 324/329 |
| 1509914 | 5/1978 | United Kingdom | 324/326 |
| 355590 | 11/1972 | U.S.S.R. . | |
| 0739451 | 6/1980 | U.S.S.R. | 324/67 |

Primary Examiner—Gerard R. Strecker

[57] ABSTRACT

Method and apparatus for determining the horizontal position and depth of a buried metallic conductor. An upper and a lower ferrite antenna, at least one rotatable in the vertical plane, and each coupled to a band-pass filter, detect the horizontal and vertical components of an electromagnetic field associated with the buried conductor. The electromagnetic field may be induced in the conductor by a portable generator, or alternatively, by alternating current already present in the conductor. The horizontal position of the conductor is determined by measuring the vertical component of the electromagnetic field at an upper or lower level and the horizontal component of the electromagnetic field at a lower or upper level. On the basis of the ratio of the two components the approximate horizontal position of the conductor is determined. The depth of the conductor is determined by measuring the horizontal component of the electromagnetic field at both the upper and the lower level. Circuit elements in the apparatus convert the voltages induced in the antennas into suitable indications of the horizontal position and depth of the buried conductor.

15 Claims, 6 Drawing Figures

METHOD AND APPARATUS INCLUDING SPACED ANTENNAS FOR DETERMINING THE TRACE AND DEPTH OF UNDERGROUND METALLIC CONDUCTORS

TECHNICAL FIELD

The subject matter of the present invention is a method and apparatus for determining the horizontal position and depth of metallic conductors located beneath ground level. According to the method provided by the invention, the electromagnetic field generated by an alternating current existing in such a buried metallic conductor is detected by two ferrite antennas, one vertically above the other. The horizontal position of the conductor and its depth are determined by means of the characteristics of the detected magnetic field. The apparatus according to the invention comprises a measuring receiver consisting of a transducer provided with an upper and a lower ferrite antenna to convert the strength of the magnetic field induced by the alternating current flowing in the metallic conductor into a voltage signal, a horizontal-position-locating unit, and a depth finder unit to determine the depth of said conductor. The method and apparatus corresponding to the present invention provides for locating underground metallic conductors faster and with a higher accuracy compared to the methods known heretofore and free of human errors.

BACKGROUND ART

Surveying and registering a densely located system of public utilities raises many problems. For example, with previous methods, determination of the horizontal position and depth of buried metallic conductors can only be accomplished with a relatively low accuracy, especially in a very "noisy" environment, i.e., in the vicinity of electrical power lines and equipment, e.g., tramway and trolley lines. The handling of known devices is sometimes difficult. Portable devices are not available; and the result of the measurements may be deteriorated by significant human errors.

A general method of locating metallic conductors is to indicate the variations of the vertical and/or horizontal components of the magnetic field generated by an alternating current existing in said conductor and detected by means of a suitable probe, usually a transducer comprising ferrite antennas. An alternating current of the required amplitude and frequency may be produced by a generator and applied to the conductor to be located at its available points. An alternating current may alternatively be induced in the conductor to be located. A common method is to connect only one pole of the generator to the conductor, the other pole being grounded.

The locating accomplished by the method described is based on the fact that if the conductor to be located is assumed to be an infinitely long straight wire, then a concentric magnetic field will exist around it. In the case of such a field pattern, the vertical and horizontal components of the magnetic field strength are equal if the wire is located at an angle of 45° from the point of measurement. The position of the conductor can be determined using this fact. Theoretically, the horizontal position of the conductor can be established by detecting the maximum value of the horizontal component and the zero level of the vertical component. Both measurements are, however, uncertain; the measurement of the maximum value may be burdened by serious human errors, and measuring the zero value is illusory, especially in a noisy environment. A device has been developed by the United States company Metrotech that utilizes a microcomputer to realize the locating method describd, wherein the measuring process is based on a stored program.

Circuits have been developed to accomplish the method described above, and are shown in German Patent Specifications DE-PS Nos. 10 64 655, 25 28 511 and 20 37 865. The solution of particular partial problems are given in these Patent Specifications to increase the accuracy or stability of detection or to accomplish an energy saving construction of the generator (powering the generator from the conductor to be located is recommended by one of these specifications).

An apparatus is described in German Patent Specification No. 955 348 that comprises two coils arranged horizontally, one above the other, and in a fixed position with respect to each other, to find the depth, while a separate antenna, which is also rigidly fixed in relation to the coils, is provided to determine the horizontal position of the buried conductor. This apparatus requires careful calibration when used.

In noisy environments, applying a generator raises particular problems, as 100 to 500 watt high-power units are used in an attempt to generate a sufficiently high level of alternating current in the conductor to suppress the disturbing effect of any current already present in the conductor. The power required to achieve this is very high, and thus developing mobile apparatus is difficult, and the generator must be carefully matched for the measurements.

A source of additional difficulty is the measuring frequency, the selection of which is commonly considered as incidental. The measuring frequency is typically an odd-order multiple of the mains frequency or approximates this value (e.g., 1450 Hz in the case of an instrument made by the SEBA company, or 1030 Hz in equipment made by RFT). In attempting to detect a magnetic field generated by an alternating current of such frequencies, the relative value of the noise may be significant, and thus a sufficiently selective measurement can not always be effected.

DISCLOSURE OF THE INVENTION

The object of the present invention is to eliminate the disadvantages described above.

It has been realized that locating the horizontal position and measuring the depth of a buried conductor can be effectively accomplished by employing ferrite antennas rotatable with respect to each other placed at two different levels for the measurements. Another important realization is that the use of an external generator is not always necessary if a sufficiently strong alternating current is flowing in the conductor. Therefore, it is advisable to make a distinction between operation with and without a generator, and to select the measuring frequency accordingly. The main point of this latter realization is that multiples of the basic frequency are selected as the measuring frequency: when a generator is applied, the measuring frequency is a properly selected even upper harmonic; when no generator is used, i.e., where there is sufficient signal level already present, the measuring frequency is an odd upper harmonic. These choices are based on Fourier-analysis of the alternating current.

Based on the observations described above, the object of the present invention is to provide a method and apparatus applicable to determine the horizontal position and depth of underground metallic conductors with high accuracy and practically free of human errors.

A method has been developed for the realization of the object described above, whereby in order to determine the horizontal position and depth of metallic conductors the magnetic field generated by an alternating current flowing in the said metallic conductor is detected by a ferrite antenna at an upper level and a second ferrite antenna at a lower level. The horizontal position of the conductor is located and its depth is determined on the basis of the measured characteristics of the magnetic field.

According to the present invention, each ferrite antenna forms the inductive branch of a parallel resonant circuit. The capacitive branch of each such resonant circuit is selected to provide a resonant freqency equal to he Nth or Mth upper harmonic of the basic frequency, where N is equal either to $(cp+1)$, preferably $(cp-1)$, or to $(2c\pm1)$, preferably $(2c-1)$, M is equal to cp or 2c, c is a properly selected integer greater than 1, p is 1, 2, 3 or 6 as required, and the product cp is an even number.

The horizontal position of the conductor is located by sensing the vertical component of the magnetic field at each of the upper or lower levels and the horizontal component of the magnetic field at the lower or upper levels. The horizontal position of the conductor is approximated to a certain extent on the basis of the ratio of these two components of the magnetic field. In order to determine the depth of the conductor, the horizontal component of the magnetic field is detected at both the upper and the lower level and the depth is calculated by means of a known formula. With the proper selection of the resonant frequencies, which are preferably the 48th and 47th upper harmonics of the basic frequency of the alternating current in the conductor, a high selectivity, and thereby sufficient accuracy of measurement, can be attained. Human errors can be prevented by means of forming and processing ratios of the measured components of the magnetic field, and preferably by forming the logarithms of the absolute value of such ratios.

The depth is preferably established by means of analog circuits, as thereby a relatively simple construction can be attained.

The object of the present invention is also served by the apparatus provided by the invention, which is applicable to implement the method described above. The apparatus comprises a measuring receiver comprising a transducer with an upper and a lower ferrite antenna to convert the magnetic field strength generated by the alternating current flowing in a metallic conductor into a voltage signal; a horizontal-position-locating unit; and a depth-measuring unit.

According to the present invention, the horizontal-position-locating unit is connected to the transducer which senses the magnetic field generated by the alternating current (which may be induced by a generator when required), and is realized as aunit that indicates a corridor of predetermined half-width depending ont he depth of the conductor.

The depth-measuring unit, also connected to the transducer, is built of analog circuit elements.

The transducer is provided with two band-pass filters (resonant circuits) consisting of passive and active filter elements. One such filter comprises the upper ferrite antenna as an inductive element. The other filter comprises the lower ferrite antenna as an inductive element. At least one of the upper and lower ferrite antennas can be rotated in the vertical plane. The capacitive elements of both such filters contain capacitors that are selected to make the resonant frequency of each of the band-pass filters equal to the Mth upper harmonic of the basic frequency of the alternating current in the wire when a separate generator is used to generate the alternating current in the wire, and equal to the Nth upper harmonic of such basic frequency when no separate generator is used, where N is equal to $(cp \pm 1)$, preferably $(cp-1)$, or to $(2c\pm1)$, preferably $(2c-1)$, M is equal to cp or 2c, c is a properly selected integer greater than 1, p is 1, 2, 3, or 6, as required, and the product cp is an even number. The horizontal-position-locating unit preferably comprises a logarithmic amplifier to locate the horizontal position of the conductor. An exponential amplifier is connected to the logarithmic amplifier in order to determine the depth of the conductor.

If an alternating current has to be generated in the conductor to be located, than a current generator is preferably applied for this purpose, as matching of the generator is not required in this case, the loading impedance is low and therfore a portable instrument can be constructed. The current generator is preferably built using a well known transformer regenerative circuit.

MODE FOR CARRYING OUT THE INVENTION

When implementing the method provided by the present invention, an easily available point of the conductor to be located is first connected to an alternating current generator, if required. Either galvanic or inductive coupling may be used. When some current is already flowing in the conductor, then the strength of the magnetic field induced may be sufficient to effect the measurements without the need for such a generator. It can be determined whether the magnetic field strength is sufficient or not by applying a reference voltage.

Two band-pass filters, each incorporating a ferrite antenna, are used for the measurements. The resonant frequency of the band-pass filters is selected according to whether or not a generator is applied for the measurement. When no external generator is used, an odd upper harmonic, preferably the 47th, of the basic frequency is selected. When a generator is used, an even upper harmonic, preferably the 48th, is selected. These values for the upper harmonics are obtained from theoretical considerations relating to the determination of the layout of said conductors.

Figure 1:
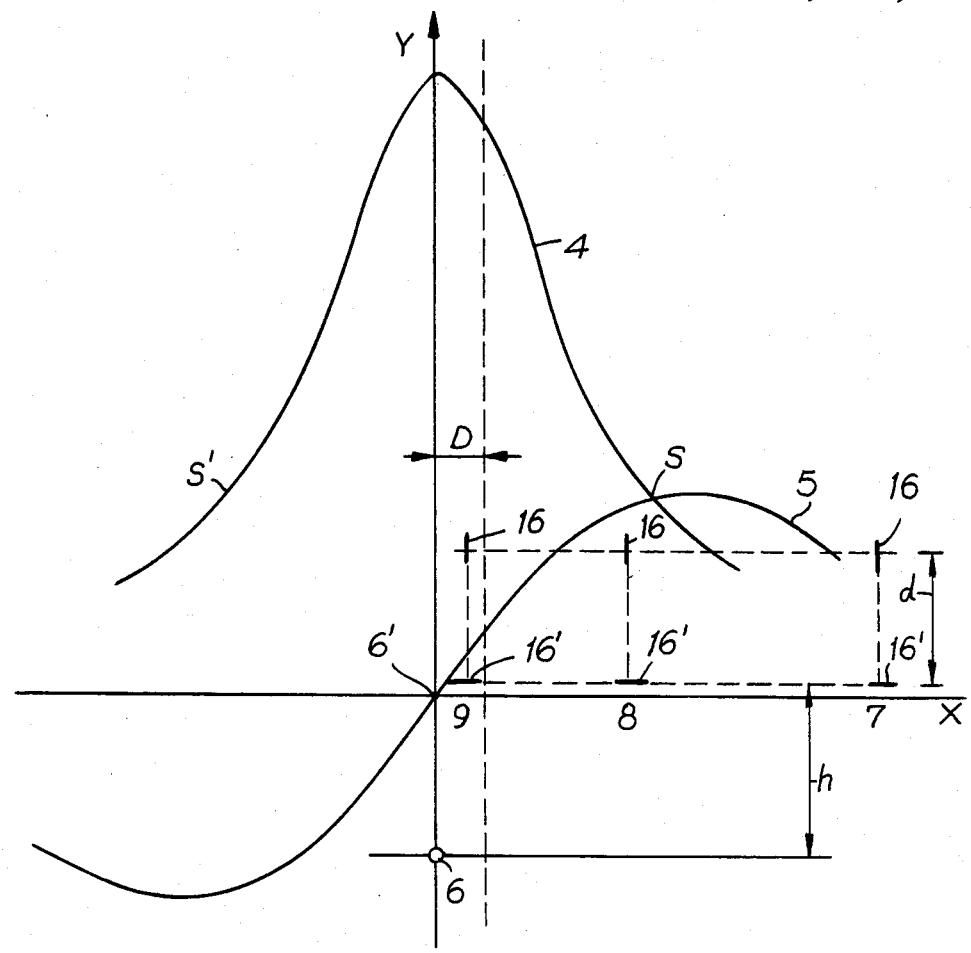
FIG. 1 is an illustration of the method provided by the invention.

For proper measuring, the upper ferrite antenna 16 is first set in a vertical position; below it the lower ferrite antenna 16' is set in a horizontal position. Naturally, a reverse arrangement can also be applied. The measurement is theoretically based on the fact that the variations of the horizontal (x-axis) component 4 and the vertical (y-axis) component 5 of the magnetic field generated around a conductor 6 positioned at a depth h in relation to the lower (in this case horizontal) ferrite antenna 16' are different (see FIG. 1). The horizontal (x-axis) component 4 forms a bell curve, while the vertical (y-axis) component 5 forms an S-curve. Considering the difference of height between the two positions (i.e., upper and lower) where the two different components are measured, the two curves can be illustrated as seen in FIG. 1. The two curves intersect at point S. The peak of component 4 is at x=0, that is at the horizontal position of the conductor to be located. In relation to point S, moving in one direction, herein the direction of increasing x values, component 5 is greater than component 4, while moving in the other direction, component 4 is greater. If the absolute value of component 5 is used, a similar effect is true at point S'.

When locating conductor 6, the horizontal position 6' of the conductor is estimated and a measurement is made at point 7. Here component 5 is greater than component 4 (if the measurement is made from an estimated position in the vicinity of point S', then the absolute value of component 5 must be considered). The quotient of the two positive values of the horizontal and vertical components of the magnetic field, and preferably the logarithm of this quotient, is computed. Out of the range between S and S', the value of this logarithm is either positive or negative depending on the formation of the quotient. At points S and S', the value of the quotient equals 1, and thus the value of the logarithm equals 0. When moving past S or S' to some position between S and S', the sign of the logarithm will reverse. Thereby limits are assigned within which locating the buried conductor is to be made with increased accuracy. The next measurement is made at point 8 and measurement is continued so that the results of succeeding measurements should be a higher and higher value with the proper sign. In the vicinity of the horizontal position 6 of the conductor, a corridor of D half-width is pointed out. The value of D depends on the depth h. The outer limits of this corridor are indicated when the value of the quotient or of the logarithm exceeds a given value. Theoretically, the half-width D may be as small as desired, but because of disturbing fields which always exist and which result in a high distortion of the vertical (y-axis) component 5 here, measuring component 5 and thereby forming the quotient and its logarithm provides unreliable results within a specified range, as has been already mentioned in connection with previously known methods. When using the method provided by the present invention, this range has been experienced to be smaller than 2 to 3 percent of the depth, i.e., in the case of a depth of 1 meter, the horizontal position 6' can be located with an accuracy of 2 to 3 cm with respect to the centerline of the conductor. This is quite sufficient.

At the outer limits of the corridor of half-width D, the value of the quotient (or the logarithm) attains a given limit value, indicated, for example, by the overflow of a visual display. Measuring is then continued at point 9 by setting both ferrite antennas to a horizontal position. Then, on the basis of the two horizontal (x-axis) components and the well known relations of physics, the depth of the conductor is determined and indicated, preferably by analog computing methods, based on the electronic circuits used for locating the horizontal position 6'.

Several methods can be used for indicating: visually, e.g., with arrows and/or digits, possibly displaying additional information, or acoustically, e.g., varying pitch of a tone and/or tone modulation, or both visually and acoustically, etc.

Figure 2:
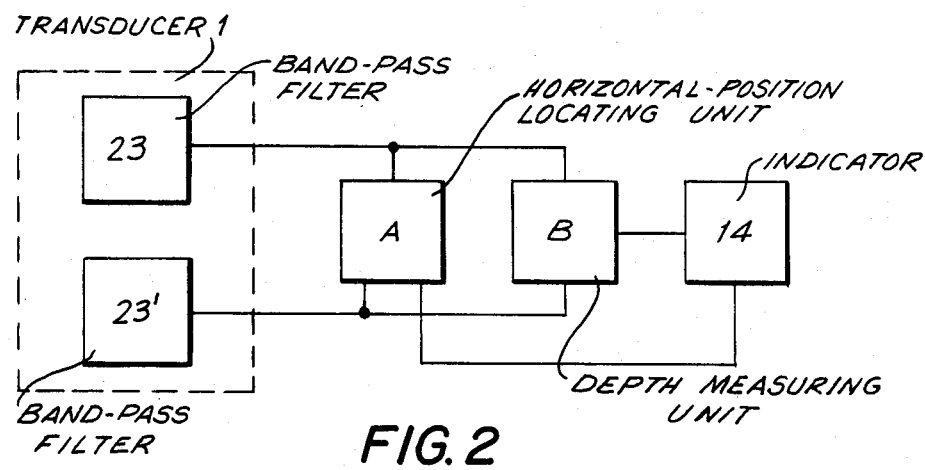
FIG. 2 is a schematic block diagram of the apparatus provided by the invention.
Figure 3:
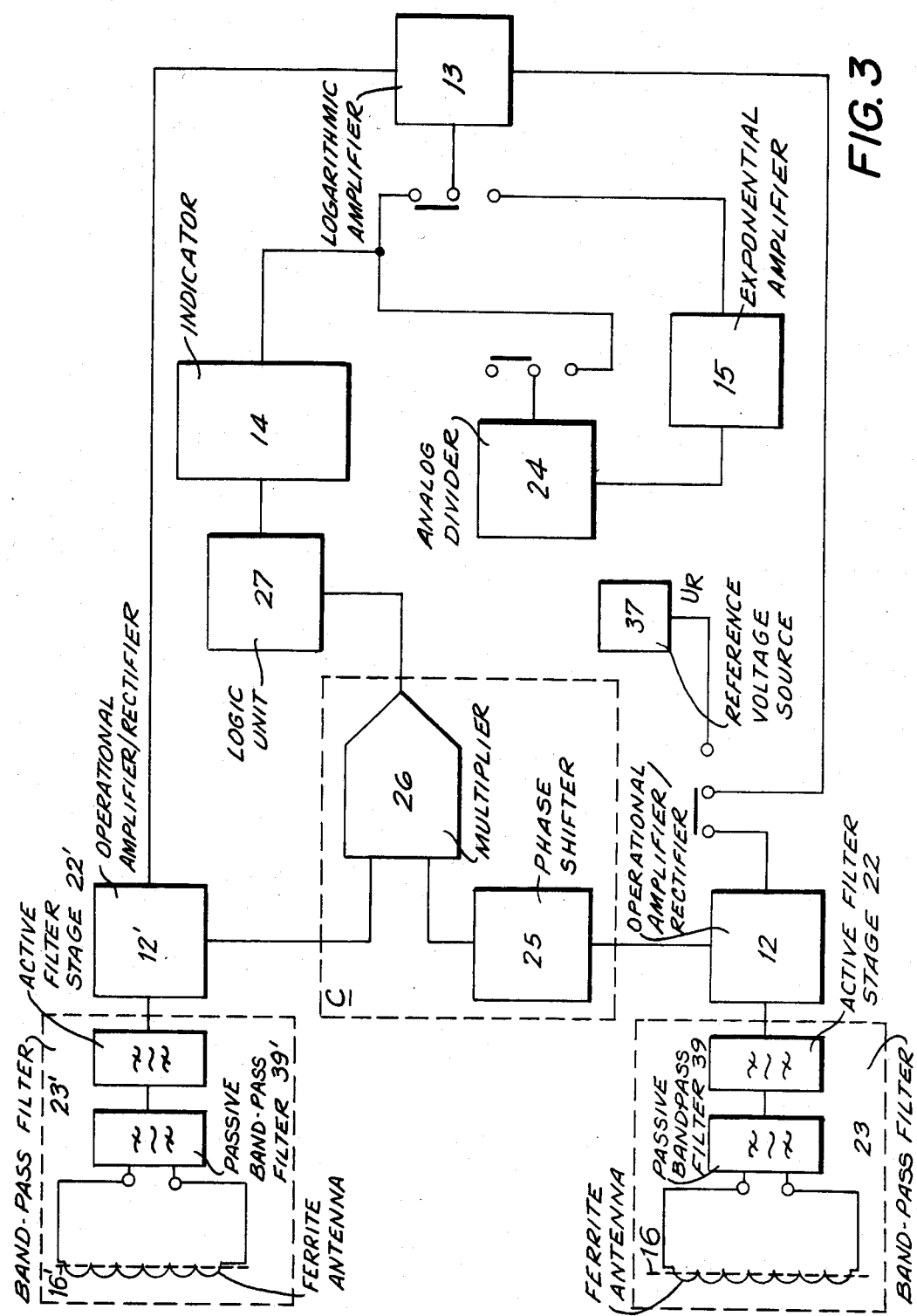
FIG. 3 is a block diagram of the measuring receiver provided by the invention.

An apparatus suitable to implement the method provided by the present invention is comprised of a measuring receiver and a generator to be used when required. The schematic block diagram of the measuring receiver is shown in FIG. 2 and in more detail in FIG. 3. In the measuring receiver, the transducer 1 comprises band-pass filters 23 and 23' built of active and passive filter elements. Each band pass filter comprises passive band pass filters 39, 39' and active filter stages 22, 22'. Their outputs are connected to the horizontal-position-locating unit A and to the depth-measuring unit B, which is also connected to an indicator unit 14 (FIG. 2). The band-pass filters 23 and 23' provide voltage signals corresponding to the field strength detected, and this voltage signal is the basis of the measurements.

The upper and lower ferrite antennas 16 and 16' are inductive elements of filters 23 and 23', respectively, the sense the magnetic field strength. Band-pass filters 23 and 23', which are parallel resonant circuits, are connected via active filter stages 22 and 22' and operational amplifiers 12 and 12' (connected as rectifiers) to unit C, which determines the position of the measuring reciever in relation to the conductor 6 to be located (see FIG. 3). The output of unit C is thereafter connected to logic unit 27. The output of logic unit 27 is connected to indicator 14. Indicator 14 may be for example a unit providing acoustic and/or visual signals. One output of each operational amplifier 12 and 12' is connected to a logarithmic amplifier 13 which is a fundamental part of the horizontal-position-locating unit A. A modified exponential amplifier 15 and an analog divider 24 are serially connected through a switch to the logarithmic amplifier 13, the output of said divider being switchably connected to indicator 14. The function of the modified exponential amplifier 15 is to provide an output equal to the value of the input to the logarithmic amplifier 13 minus 1.

The interconnection between operational amplifier 12 and logarithmic amplifier 13 may be switchably broken and a referance voltage source 37 switchably interposed, applying a voltage of $U_r$ to the logarithmic amplifier 13. The reference voltage source 37 provides a basis for evaluating the measured magnetic field strength when necessary, and makes it possible to decide whether or not to use a generator (a generator is required, for example, when the conductors are densely laid side by side, the current flowing in the conductor to be located is small, etc.).

Unit C comprises, in series connection, a phase shifter 25 and a multiplier unit 26. The input of phase shifter 25 is connected to operational amplifier 12. One input of multiplier unit 26 is connected to operational amplifier 12', and the other input of multiplier unit 26 is connected to the output of phase shifter 25.

Figure 4:
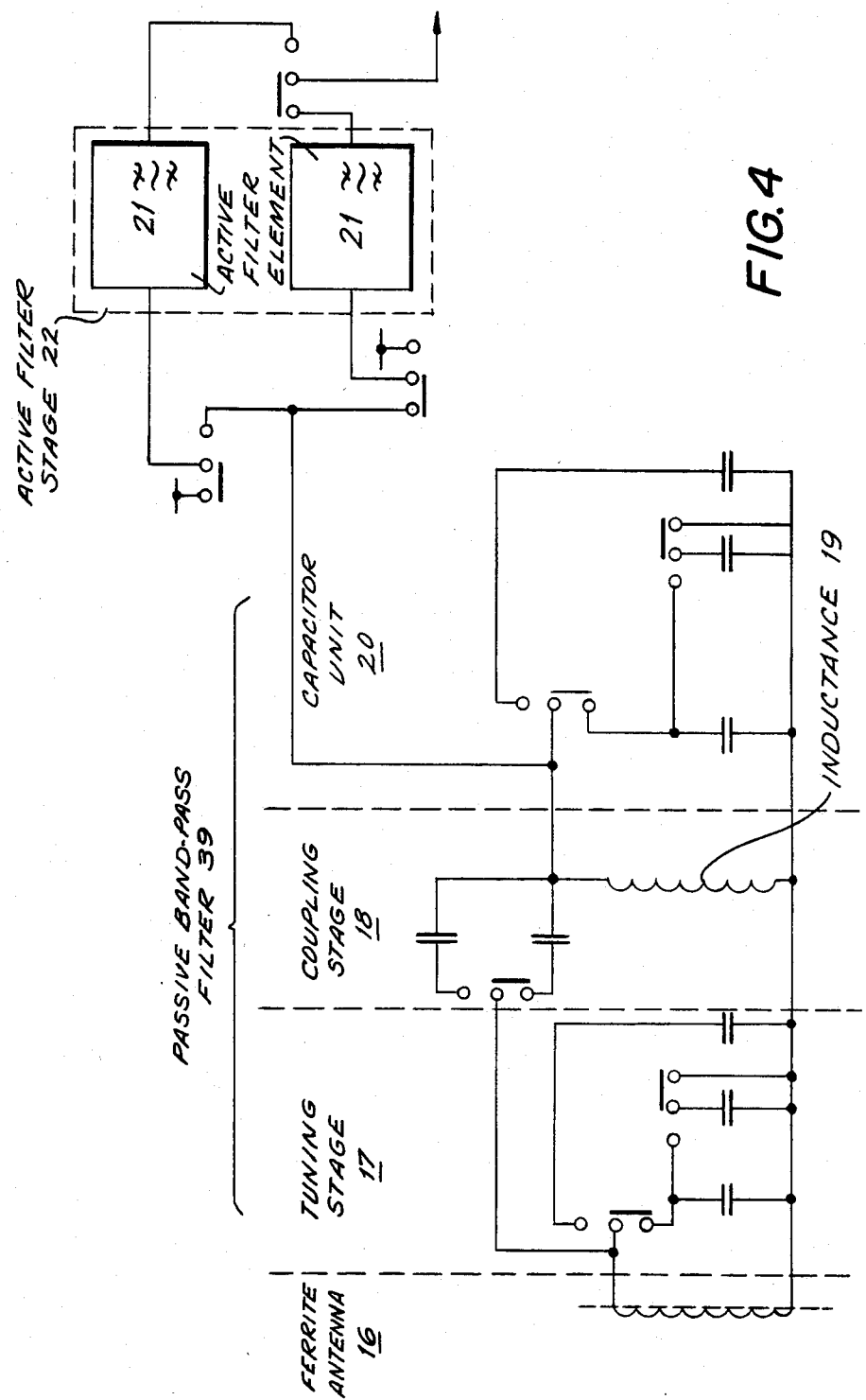
FIG. 4 is a circuit diagram of the band-pass filter in the measuring receiver.

Band-pass filter 23 (see FIG. 4) comprises ferrite antenna 16, followed by a tuning stage 17 (including parallel capacitors switchable as required), a coupling stage 18 (provided with an inductance 19), a capacitor unit 20, and active filter stage 22, which further comprises active filter elements 21. Stages 17 and 18 (including element 19) and capacitor unit 20 are shown collectively as passive band pass filter 39 in FIG. 3. The switchable capacitors of coupling stage 18 provide for adjusting the resonant frequencies depending on whether the operating mode is with or without a generator. Band-pass filter 23' has a similar construction.

Figure 5:
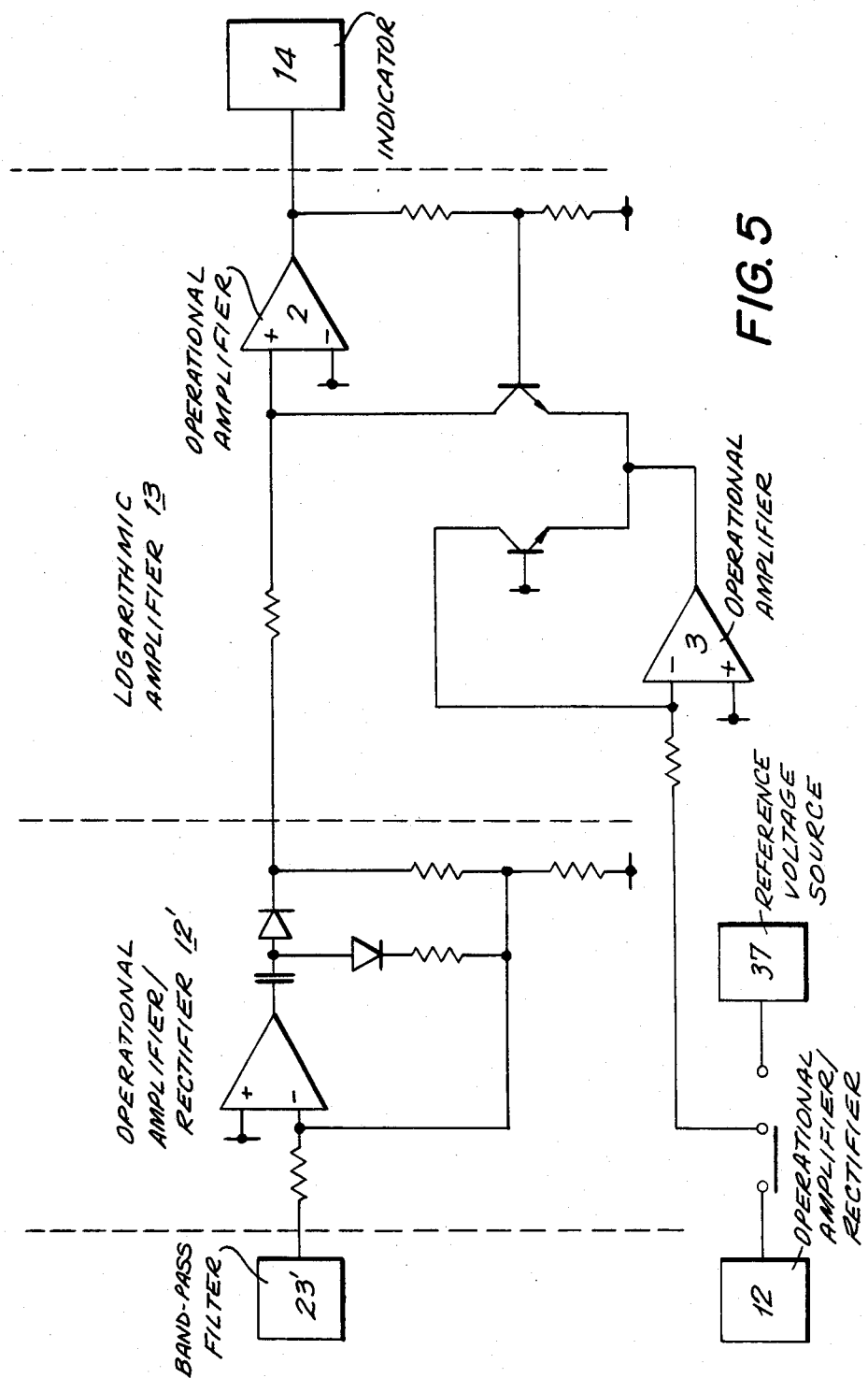
FIG. 5 is a circuit diagram of the active rectifier circuit and logarithmic amplifier built of operational amplifiers.

The circuit realization of operational amplifier 12 connected as a rectifier (FIG. 5) is well known in itself and requires no comments. Band-pass filter 23' is connected to operational amplifier 12', while band-pass filter 23 is connected to operational amplifier 12. Both band-pass filters are connected to logarithmic amplifier 13. Logarithmic amplifier 13 is built of operational amplifiers 2 and 3, where the output of operational amplifier 3 is fed back to its inverting input and the ouput of operational amplifier 2 is fed back to its noninverting input, in each case by a transistor, the emitters of the two transistors being connected together. Thereby processing of the voltage signal is facilitated from the measuring point of view, and the measured signal retains its sign relating to its natural value given in dBs.

The units described herein can also be accomplished in different ways by utilizing known circuits and elements.

When developing the apparatus and method provided by the present invention a fundamental realization was the fact, well known from the theory of the rectifying circuit, that n-order upper harmonics exist in the current I of a p-cycle rectifying circuit, where $n = cp \pm 1$, c is 1, 2, 3, ..., and, in the case of practicable circuits, p is 1, 2, 3, and 6. At the frequencies of the 24th and 48th upper harmonics, however, no upper harmonic exists for any value of p. Therefore, these frequencies are preferably selected when a generator is to be used. Because ferrite antennas and band-pass filters are used, the 48th upper harmonic is more favorable. However, if a generator is not used, the 47th upper harmonic is always present, and therefore the band-pass filters 23 and 23' can be easily retuned to the 47th upper harmonic with small auxiliary capacitors. The current obtained is only one 47th part of that obtained at the basic frequency, but it is measureable quite well.

Figure 6:
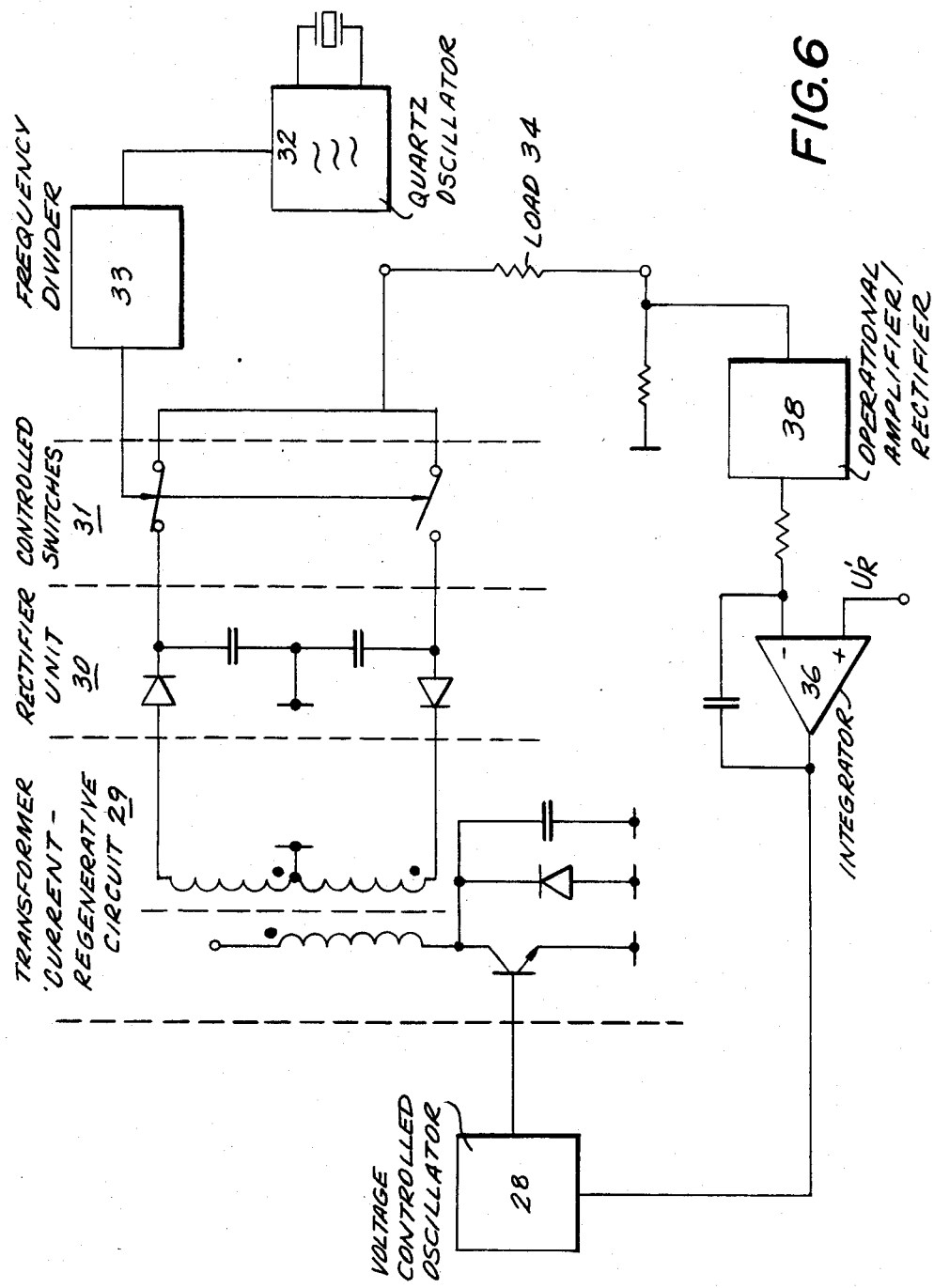
FIG. 6 is a preferred circuit showing the current generator developed for the generator mode of operation of the apparatus provided by the present invention.

For the apparatus provided by the invention, the generator is preferred to be realized as a current generator exemplified by the circuit diagram shown in FIG. 6. In this case, a transformer current-regenerative circuit 29 is connected to the output of a voltage-controlled oscillator 28 to drive rectifier unit 30 and controlled switches 31. One pole of load 34 is connected to one pole of said switches, while the other pole is connected to the input of voltage-controlled oscillator 28 via an operational amplifier 38 connected as a rectifier and an integrator 36. Controlled switch 31 is connected to a frequency divider 33 and a quartz-controlled oscillator 32. The non-inverting input of integrator 36 is connected to a source providing a reference voltage $U'_R$.

The method and apparatus corresponding to the present invention provides for determining the horizontal position and depth of conductors conducting an alternating current with high selectivity and accuracy.

I claim:

1. A method for determining the horizontal position and depth of an underground metallic conductor in which there exists an alternating current of a basic frequency which generates a corresponding electromagnetic field having horizontal and vertical components, said method comprising:

(a) detecting the electromagnetic field by ferrite antennas at an upper and a lower level, at least one of which is rotatable in a vertical plane, wherein the ferrite antennas are inductive elements of first and second band pass filter circuits, respectively, the capacitance of such circuits being selected such that each of the circuits has a resonant frequency equal to the Nth upper harmonic of the basic frequency when a separate generator is not used to generate the alternating current in the conductor, and each of the circuits has a resonant frequency equal to the Mth upper harmonic of the basic frequency when a separate generator is used to generate the alternating current in the conductor, wherein (i) N is equal to $(CP \pm 1)$ or $(2C \pm 1)$, (ii) M is equal to CP or 2C, (iii) C is a properly selected integer greater than 1, (iv) P is 1, 2, 3, or 6, and (v) the product CP is an even number;

(b) determining the horizontal position of the conductor from sensing the vertical component of the magnetic field at either one of the upper and the lower levels, sensing the horizontal component of the magnetic field at the other of the levels, and forming the ratio of the two sensed components; and (c) determining the depth of the conductor from sensing the horizontal component of the magnetic field at both the upper and lower levels.

2. The method of claim 1 wherein the resonant frequency of each of the circuits is the Nth upper harmonic of the basic frequency when a separate generator is not used to generate the alternating current in the conductor, where N is equal to $(CP-1)$ or $(2C-1)$.

3. The method of claim 1 wherein the horizontal position of the conductor is determined by moving in a direction determined by the sign of the logarithm of the absolute value of the quotient of the sensed vertical and horizontal components of the magnetic field to a corridor including the horizontal position of the conductor, the width of the corridor being determined by the magnitude of said absolute value.

4. The method of claim 1 wherein analog circuits are used to determine the depth of the conductor.

5. The method of claim 1 wherein the resonant frequency of each of the band pass filter circuits is equal to the 47th upper harmonic of the basic frequency when a separate generator is not used to generate the alternating current in the conductor.

6. The method of claim 1 wherein the resonant frequency of each of the band pass filter circuits is equal to the 48th upper harmonic of the basic frequency when a separate generator is used to generate the alternating current in the conductor.

7. Apparatus for determining the horizontal position and depth of an underground metallic conductor in which there exists an alternating current of a basic frequency which generates a corresponding electromagnetic field having vertical and horizontal components, comprising:

(a) a measuring receiver comprising a transducer, which transducer comprises a first ferrite antenna and a second ferrite antenna, at least one of which is rotatable in a vertical plane, for converting the magnetic field strength into voltage signals;

(b) a horizontal position locating unit electrically connected to the transducer for sensing the voltage signals corresponding to the magnetic field and for pointing out a corridor of a predetermined half-width depending on the depth of the conductor; and (c) a depth measuring unit, comprising analog circuits, electrically connected to the transducer for sensing the voltage signals corresponding to the magnetic field and for determining the depth of the conductor;

wherein the transducer comprises:

first and second band-pass filters, each comprising inductive elements and capacitive elements in electrical parallel, and further comprising active and passive filter elements, wherein the first ferrite antenna is an inductive element of the first filter and the second ferrite antenna is an inductive element of the second filter and the capacitive elements of the filters comprise capacitors selected such that the resonant frequency of both filters is the Nth harmonic of the basic frequency when a separate generator is not used to generate the alternating current in the conductor, and the resonant frequency of both filters is the Mth harmonic of the basic frequency when a separate generator is used to generate the alternating current in the conductor, wherein (i) N is equal to (CP±1) or (2±C1), (ii) M is CP or 2C, (iii) C is a properly selected integer greater than 1, (iv) P is 1, 2, 3, or 6, and (v) the product CP is an even number.

8. The apparatus of claim 7 further comprising first and second operational amplifiers each being applied as a rectifier, wherein the input of the first amplifier is connected to an active filter stage which is the output stage of the first band-pass filter, the input of the second amplifier is connected to an active filter stage which is the output stage of the second bandpass filter, and the outputs of both amplifiers are connected to the horizontal position locating unit.

9. The apparatus of claim 8 wherein the horizontal-position-locating unit comprises:

a logarithmic amplifier connected to the outputs of both the first and second operational amplifiers being applied as active rectifiers; and an indicator, connected to the output of the logarithmic amplifier.

10. The apparatus of claim 9 further comprising a unit for determining the relative position of the measuring receiver with respect to the conductor, wherein the unit comprises a two-input multiplier and a phase shifter, wherein one input of the multiplier is connected to the output of the first operational amplifier, the other input of the multiplier is connected to the output of the phase shifter, the input of the phase shifter is connected to the output of the second operational amplifier, and the output of the multiplier is connected through a logic unit to the indicator.

11. The apparatus of claim 10 further comprising a reference voltage source, wherein an input of the logarithmic amplifier is switchable between the reference voltage source and the ouptut of the second operational amplifier.

12. The apparatus of claim 11 wherein the depth measuring unit further comprises an exponential amplifier the input of which is switchably connected to the output of the logarithmic amplifier, the output of the exponential amplifier being connected to an analog divider which is in turn serially connected to the indicator.

13. The apparatus of claim 12 wherein the logarithmic amplifier comprises a transistor and a third operational amplifier, wherein the output of the third operational amplifier is connected to the base of the transistor and the non-inverting input of the third operational amplifier is connected to the collector of the transistor.

14. The apparatus of claim 1 further comprising a current generator for generating an alternating current in the underground conductor.

15. The apparatus of claim 14 wherein the current generator comprises:

(a) a voltage-controlled oscillator, the output of which is connected to (b) a transformer current-regenerative circuit, which is in turn connected to (c) a rectifier, which in turn is connected to (d) controlled switches, the outputs of which are connected to (e) one pole of a load; and wherein another pole of the load is connected to (f) an operational amplifier applied as an active rectifier which in turn is connected to the inverting input of an integrator being connected to the input of the voltage-controlled oscillator.

* * * * *